UNITED STATES PATENT OFFICE.

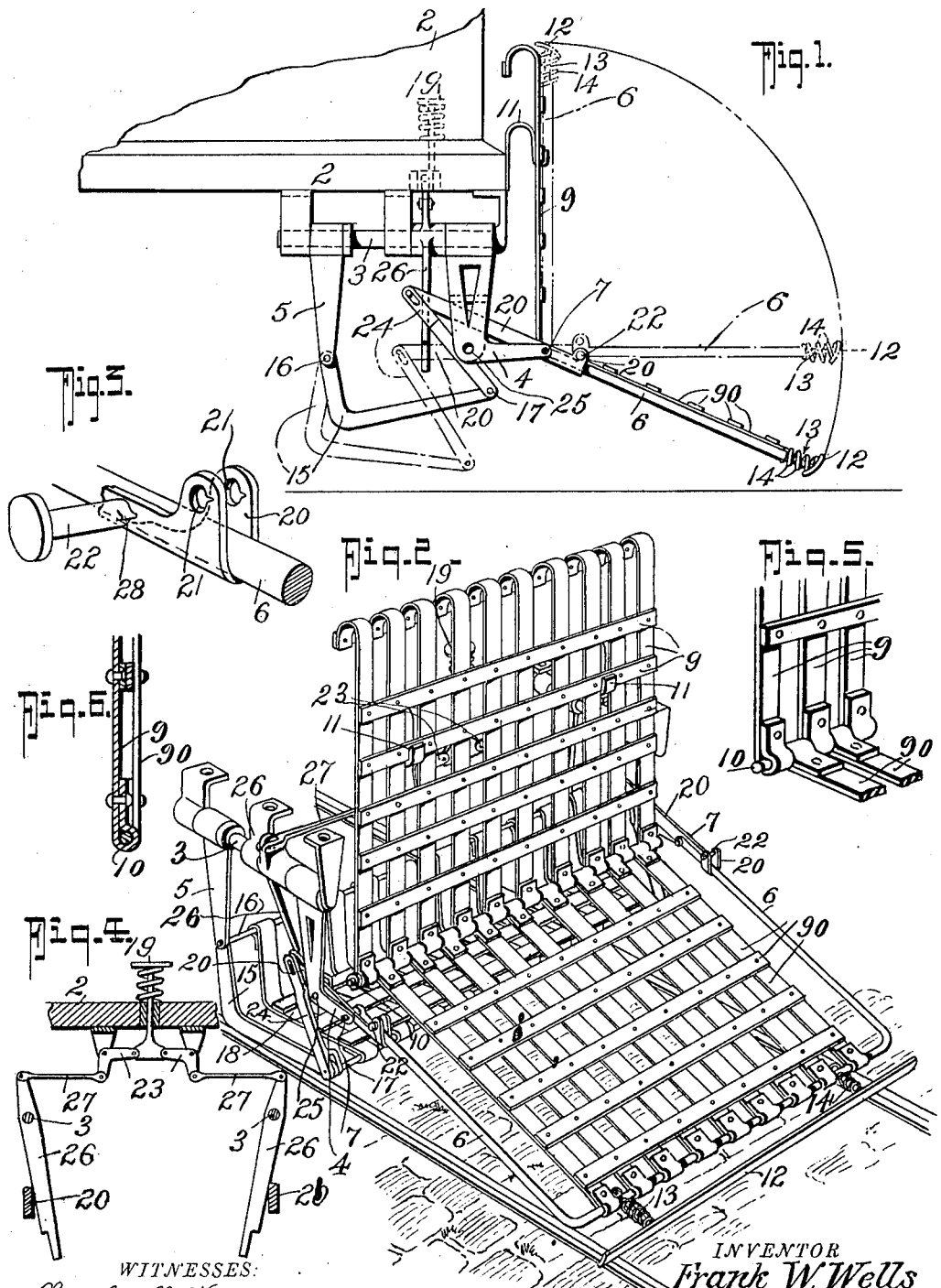

FRANK W. WELLS, OF VANCOUVER, BRITISH COLUMBIA, CANADA.

CAR-FENDER.

1,022,167.  Specification of Letters Patent.  Patented Apr. 2, 1912.

Application filed May 23, 1910. Serial No. 562,914.

*To all whom it may concern:*

Be it known that I, FRANK W. WELLS, citizen of the United States of America, residing at Vancouver, in the Province of British Columbia, Canada, have invented a new and useful Car-Fender, of which the following is a specification.

This invention relates to a street car fender which has been designed to prevent an obstruction from passing under the body of the car or its wheels where such obstruction lies so low to the track that it will pass under a fender of ordinary construction.

The front rail of a car fender cannot, owing to the oscillation of the car vertically, be kept sufficiently close to the track to prevent an obstruction passing under the car. Various attempts have been made to avoid this contingency. Some of them involve a means by which the front end of the fender on encountering an obstacle is lowered from its normal position to the level of the track. This is considered objectionable in that the device cannot act with sufficient rapidity to prevent some portion at least of a body which may be lying upon or be thrown on the track from getting under the front end of the fender and when the frame of the fender is rapidly brought down the danger of injury is increased rather than otherwise. Attempts have been made to provide a supplementary fender behind the main one which supplementary fender is lowered to the track as the front one lifts and although this provision meets the requirements in that it prevents a body from passing under the car, the back fender being formed in one with the main fender the front fender cannot conveniently be folded up out of the way when not required for use as when the direction of movement of the car is reversed.

My object has, therefore, been to provide a supplementary fender behind the main fender the movement of which supplementary fender is coöperative with the upward movement of the front end of the main fender the same being accomplished by an articulated connection that will not interfere with the folding up of the main fender when required, but that when the fender is in use and the front end lifts to pass over an obstacle the following supplementary fender will be lowered to the track level to encounter and retain the obstacle and thus prevent it from passing under the car. The particular manner by which these objects are attained is fully described in the following specification, reference being made to the drawings by which it is accompanied, in which:

Figure 1 is a side elevation of the fender as applied to the front end of a street car, the full lines indicating the normal position and the dot and dash lines indicating the movement of both fenders when the front end of the main fender lifts to pass over an obstacle, while the dash and double dot lines indicate the position of the main fender when folded up against the front end of the car. Fig. 2 is a perspective view of the fender as in use the end of the car body to which it is secured not being shown. Fig. 3 is a detail perspective view showing a portion of the member 20 and the frame rod 6, with the pin 22 illustrated as removed from the openings 21, although shown as abutting the member 20. Fig. 4 is a detail showing the retaining latches which hold the supplementary fender down and the means by which these latches are released by the motorman. Fig. 5 is a detail perspective view of a part of the invention. Fig. 6 is a detail vertical section of the same, showing the parts folded up.

In these drawings 2 represents the end of the car body, to the under side of which are connected downwardly projecting brackets 4 and 5. The forward pair 4 carries the frame of the fender proper, and the after pair 5 that of the supplementary fender. The connection of the brackets 4 and 5 is preferably made by suspending them on a rod 3 parallel to the under side and side of the car body so as to permit them to swing laterally while they are afforded the necessary support otherwise.

The frame of the main fender is pivotally mounted at 7 to the lower end of the suspended brackets 4 and comprises a simple open U-shaped frame 6 to the front rail of which is connected a latticework 90 of lengthwise and crosswise members of thin flat resilient material. This latticework 90 of the main fender forms a horizontal portion which is hinged by a rod 10 to a vertical portion 9 by which the latticework is supported on hook members 11 on the front end of the car, the hinged joint at 10 enabling the horizontal portion to be folded up against the end of the car when not in use. Parallel to the front rail of the frame 6 and a short distance in advance of it is a cushion rail 12 having studs 13 which are endwise movable in the front bar of the frame 6 against the resistance of springs 14.

The foregoing described the main fender which would satisfy the requirements of the case if the front rail of it could be carried close to the track without risk of contact. For reasons before explained this cannot be done and it becomes necessary to make provision whereby the front rail will lift over an obstacle and in that lifting will depress the front rail of a supplementary fender which is mounted on the rear brackets 5.

The frame of the supplementary fender consists of L shaped sides 15 with a pivot rail 16 and front rail 17. Between these rails 16 and 17 and conforming approximately to the L shape of the side frames is a latticework of lengthwise and crosswise-arranged thin strips 18 similar to those of the main fender.

Mounted on the same pivots 7 on which the frame 6 of the main fender is carried are rearwardly extending members 20 on each side which are free to turn on the pivots 7 independent of the frame 6 but may be connected to move with it by a pin 22 inserted through a pin-hole 21 in the forward end of the members 20 which on each side embraces the frame 6 so that with this pin in place the members 20 must move as one with the frame 6 but when the pin is withdrawn the main frame may be folded up against the front end of the car. The after end of the member 20 is connected by a link 24 at each side to the front end of the supplementary fender frame 15 so that as the front end of the main fender is raised that of the supplementary fender is lowered. The pin-hole 21 in member 20 is elongated to permit of a slight upward movement of the supplementary fender in the event of it meeting with an irregularity on the track which might otherwise injure the frame. When the pin 22 is removed from the pin-hole 21 to enable the main fender to be folded up out of use the supplementary fender may be lifted up and the pin 22 inserted in a hole 25 to maintain the supplementary fender in the out-of-use position, the bar 15 resting on said pin.

In order to prevent the supplementary fender from rebounding or lifting from the track beyond the amount provided for in the elongation of the pin-holes of the links 24 and by so doing render abortive the object for which it is provided, it may be found necessary to latch the supplementary fender automatically in the downward position. In the drawing is shown a means for accomplishing the result by the use of latches 26 (see Fig. 4), which hang free on the rod 3 on which the fender laterally swings and which will when the supplementary fender is depressed engage the backward member 20 and hold it in depressed position until the same is released. The release of the supplemental fender is effected from the foot plate of the car by a treadle 8 the lower end of which is connected to one arm of bell crank levers 23 the other arms of which are connected by rods 27 to the upper end of the pendulum latch levers 26.

A car fender provided with a supplementary device such as is here described and so connected that both fenders may be lifted out of the way when not in use will form a desirable addition to any car, as if the main fender should encounter an obstacle which is inclined to pass under it the main fender is free to lift and in so doing throws down the supplementary fender to the level of the track.

Having now particularly described my invention and the manner of its operation, I hereby declare that what I claim as new and desire to be protected in by Letters Patent, is:

1. In a car fender, the combination with a main fender including a vertical portion which extends up the front end of the car and a forwardly extending portion pivotally connected to fold up against the vertical portion, a supplementary fender behind the main fender the front rail of which supplementary fender is susceptible of being lowered to and raised from the track level and articulated means for connecting the main fender to the supplementary fender so that as the front rail of the main fender is lifted the front rail of the supplementary fender will be depressed and means under the control of the motorman for latching the fenders to hold the main fender horizontally and the supplemental fender with its front rail close to the track.

2. A car fender comprising in combination, a rectangular frame projecting forwardly from and pivotally mounted in brackets downwardly projecting from the front end of a car to which frame the supporting latticework of the fender is attached, members mounted on the same pivots and projecting backwardly therefrom, means for releasably securing these members to the side members of the main fender frame so as to be movable with it on its pivot, a supplementary fender pivotally mounted on brackets depending from the under frame of the car behind those of the main fender and links connecting the front end of the supplementary fender to the rearwardly projecting side members of the main fender.

3. A car fender comprising in combination, a rectangular frame projecting forward from and pivotally mounted in brackets downwardly projecting from the under frame of the car, members mounted on the same pivots and projecting backward therefrom, means for connecting these backwardly projecting members to the side members of the main fender frame, means for releasing such connection, a supplementary fender pivotally mounted behind the main fender, links connecting the front end of the supplementary fender with the members backwardly projecting from the main fender side frame, and a latch to retain the supplementary fender in the downward position.

4. In a car fender in combination, a main fender having a vertical and forwardly projecting portion pivotally connected at their junction, a front rail in advance of that of the main fender toward which it is movable against the resistance of springs, a supplementary fender pivotally mounted to the car frame behind the main fender, articulated means for connecting the main fender to the supplementary fender so that as the front end of the main fender lifts up that of the supplementary fender is depressed, removable means for securing the supplementary fender in the downward position and removable means for sustaining the supplementary fender clear of the track.

5. In a car fender having main and supplementary forwardly projecting body-catching receptacles coöperative together so that the upward movement of the main one lowers the supplementary one, means for automatically securing the supplementary receptacle at the lower limit of its movement and means for releasing said securing means.

6. In a car fender, main and supplementary body catching receptacles, link connections between said receptacles to cause the supplementary receptacle to drop when the main receptacle is elevated and vice versa, means forming a part of said link connections to permit a limited upward movement of the supplementary receptacle without affecting the position of the main receptacle and releasable means for latching the main body catching receptacle to hold it in a horizontal position.

In testimony whereof I have signed my name to this specification in the presence of two subscribing witnesses.

FRANK W. WELLS.

Witnesses:
  ROWLAND BRITTAIN,
  ALEXANDER SMITH.

---

Copies of this patent may be obtained for five cents each, by addressing the "Commissioner of Patents, Washington, D. C."